United States Patent [19]
Mitchell

[11] Patent Number: 5,428,935
[45] Date of Patent: Jul. 4, 1995

[54] ANCHORS FOR IMPACT ATTENUATION SAFETY CUSHION SYSTEM

[76] Inventor: Chester L. Mitchell, 21152 Rinpath Dr., Covina, Calif. 91724

[21] Appl. No.: 943,361

[22] Filed: Sep. 10, 1992

Related U.S. Application Data

[63] Continuation-in-part of Ser. No. 825,243, Feb. 29, 1992, Pat. No. 5,298,217.

[51] Int. Cl.6 .................. F16B 19/00; F16B 13/02
[52] U.S. Cl. .................. 52/698; 52/506.05; 411/371; 411/451; 411/452; 411/500; 411/901
[58] Field of Search ........... 52/511, 698, 703, 745.21, 52/506.05; 411/82, 500, 901, 902, 446, 451, 452, 456, 455, 510, 371

[56] References Cited

U.S. PATENT DOCUMENTS

| | | | |
|---|---|---|---|
| 988,744 | 4/1911 | Svoboda | 411/452 |
| 1,971,726 | 8/1934 | Norwood | 52/698 |
| 2,999,431 | 10/1957 | Mitchell . | |
| 3,120,148 | 2/1964 | Prutton | 411/451 |
| 3,121,366 | 2/1964 | Panzer | 411/456 |
| 3,214,875 | 11/1965 | Slowinski et al. | 52/479 |
| 3,244,057 | 4/1966 | Mathison | 411/510 |
| 4,003,175 | 1/1977 | Patry | 411/456 |
| 4,718,802 | 1/1988 | Rockenfeller et al. | 411/455 |
| 4,776,739 | 10/1988 | Hamman | 411/510 |
| 4,973,211 | 11/1990 | Potucek | 411/456 |

FOREIGN PATENT DOCUMENTS 1370957 7/1964 France .................. 411/456

*Primary Examiner*—Michael Safavi
*Attorney, Agent, or Firm*—Robbins, Berliner & Carson

[57] ABSTRACT

Compositions and designs useful for fabricating safety cushion and mat assemblies which have effective protection against injuries to persons falling from a height of up to twelve feet are disclosed. The rubber anchor composition has a shore hardness of about 73 and comprises a natural rubber, a processing aid agent, a plasticizer, a filler, an antioxidant, an antiozonant, an activator, an accelerator, a vulcanizer, an inhibitor and optionally a colorant or a whitener. Moreover, the rubber anchor comprises a rounded head portion with a diameter of about 1.5–2.2 inches and a thickness of about 0.15–0.5 inches; a bolt portion of about 3–6 inches in length, and a diameter of about 0.4–0.8 inches, preferably the bolt portion further has indentations. In addition, preferably a metal washer is embedded in the bottom of the rounded head portion to provide further anchoring support to prevent the impact attenuation safety cushion and system from being pulled up from the ground.

Methods of fabricating the safety cushion, mat assemblies and securing anchors described above improves the fabricating process so that larger pieces of safety cushion can be molded and that the composition material does not stick to the mold thereby increases production efficiency.

6 Claims, 4 Drawing Sheets

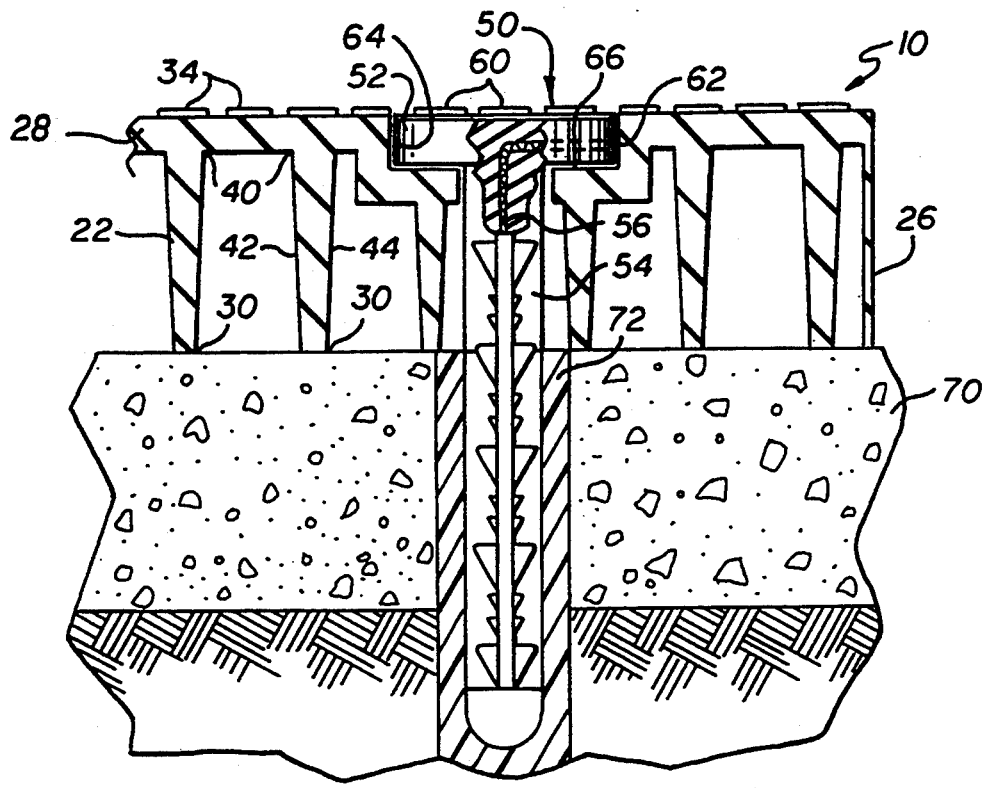
FIG. 3a
FIG. 3b
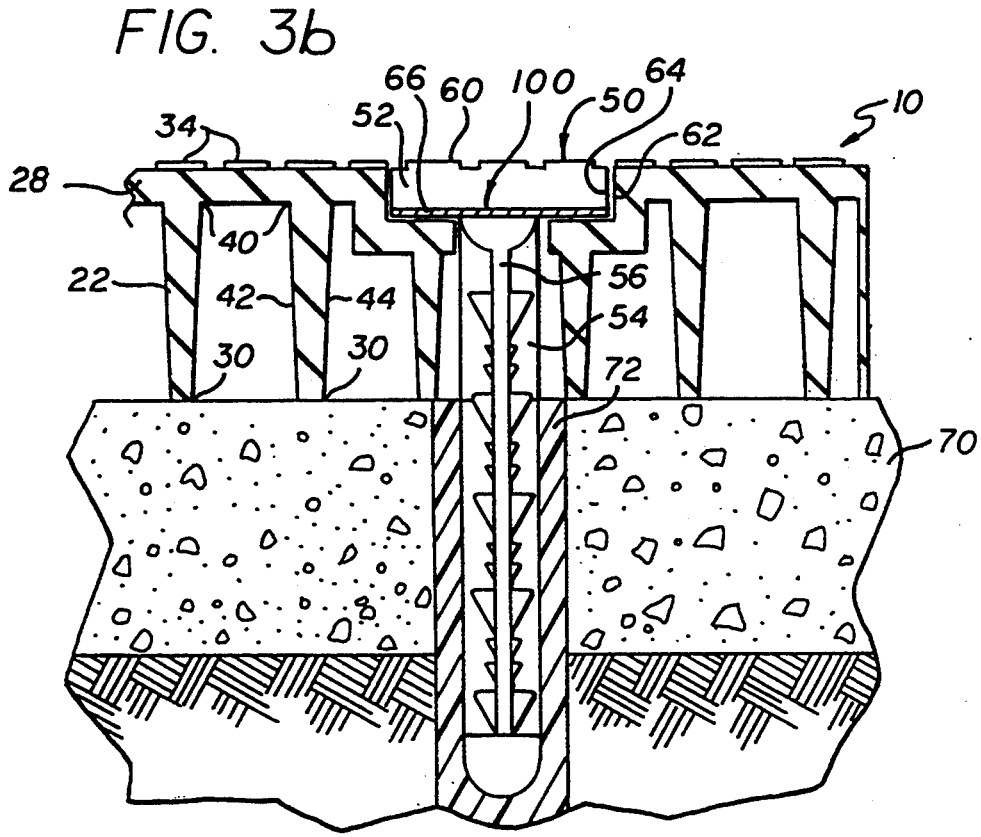

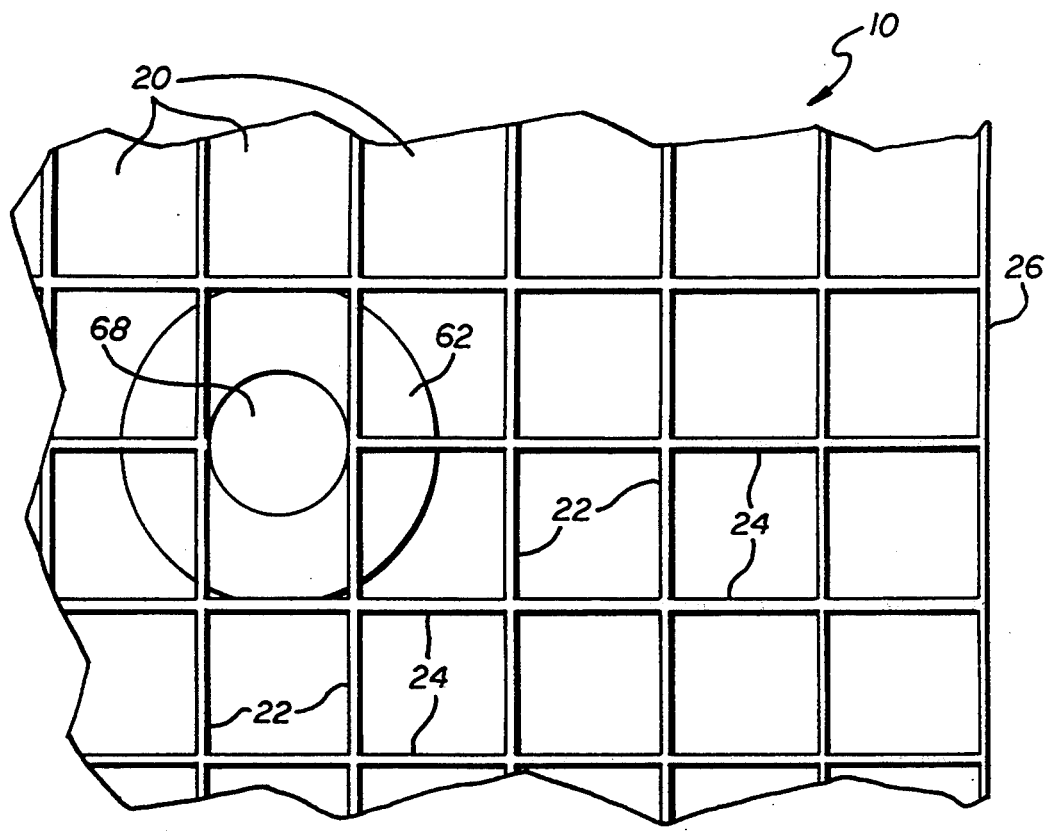
FIG. 4
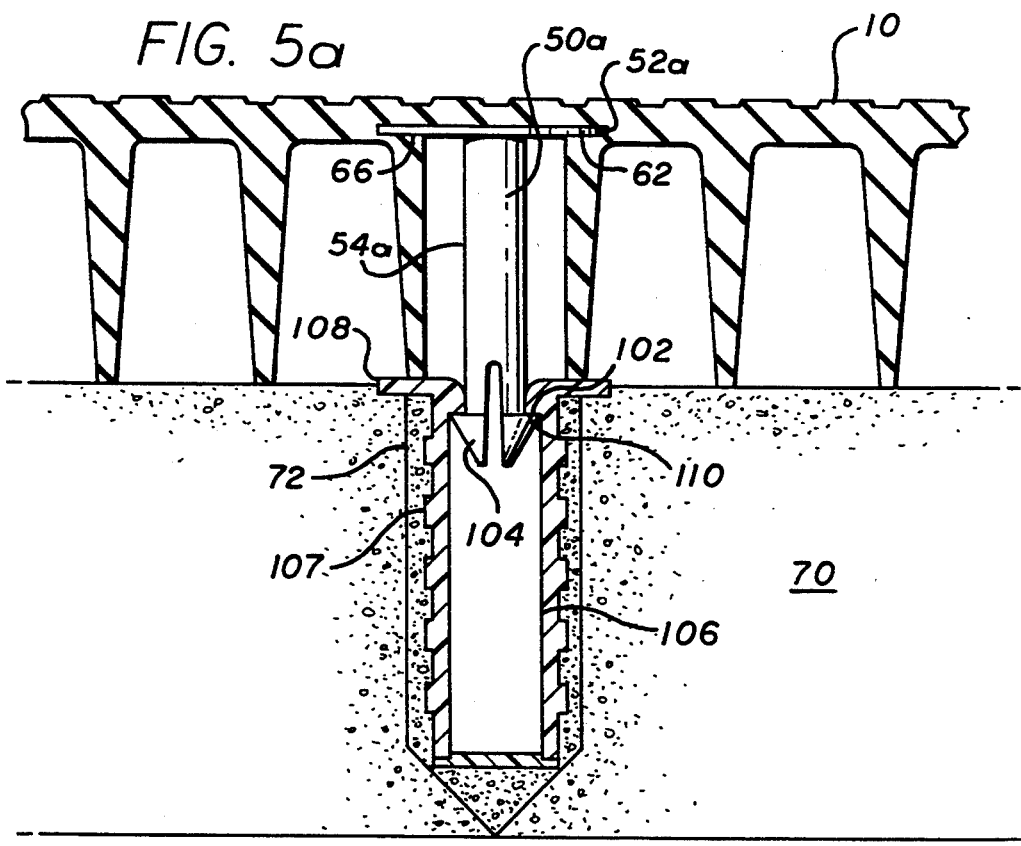

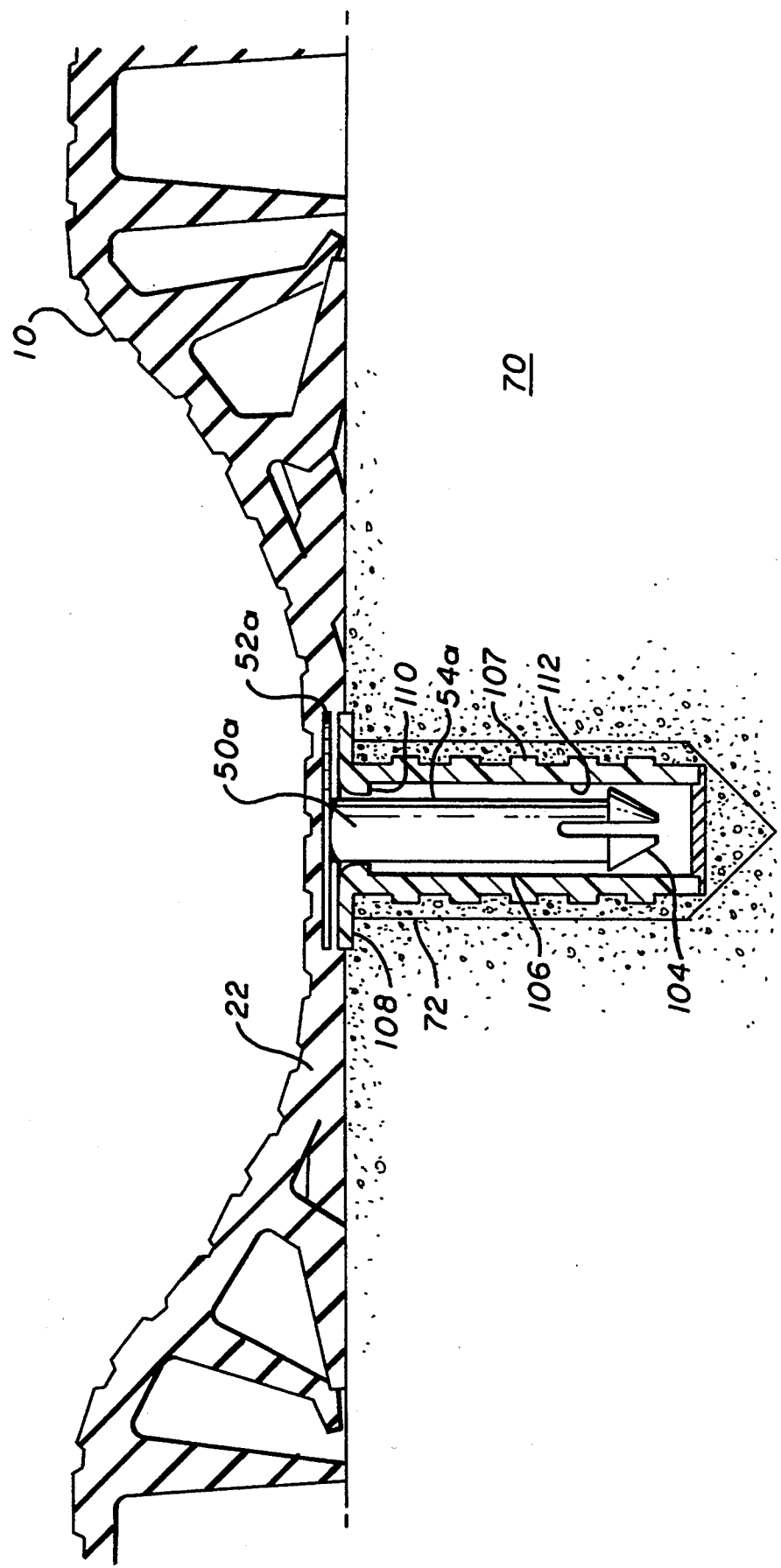

ANCHORS FOR IMPACT ATTENUATION SAFETY CUSHION SYSTEM

This application is a continuation-in-part of parent application Ser. No. 825,243 filed Feb. 28, 1992, now U.S. Pat. No. 5,298,217.

BACKGROUND OF THE INVENTION

1. Technical Field

The present invention relates to chemical compositions useful for fabricating safety cushions, mats formed from an assembly of such safety cushions and anchor for securing such mat to the ground. More particularly, the safety cushion and mat assembly meet and exceed the ASTM Standard Specification F1292-91 for impact attenuation of surface systems under and around equipment located in playgrounds, roof-top recreational areas, running tracks (indoor and outdoor), health club, aerobic dance facilities, veterinary hospitals, gymnasium or the like.

As used herein, the term "safety cushion" means a shock attenuating coverings for floor and ground surface that can be used to reduce the threat of danger to a person falling off equipment by reducing the impact force to the head to less than 200 g's from a drop height of up to twelve feet.

As used herein, the term "mat" means an assembly of individual safety cushions which are interlocked together in such a manner to cover a surface of a rectangular, circular, oval, L's, T's, crosses or other geometrical shapes.

As used herein, the term "around equipment" means the area under and surrounding equipment established as protection from falls from equipment.

As used herein, the term "acceleration" means the time rate change of velocity.

As used herein, the term "deceleration" means the time rate of reduction of velocity.

As used herein, the term "g" means acceleration into gravity at the earth's surface at sea level (32 ft/s (9.8 m/s)).

As used herein, the term "g-max" means the multiple of "g" that represents a maximum deceleration experienced during an initial impact.

As used herein, the term "headform" means the striking part of a testing apparatus.

As used herein, the term "impact attenuation" means the ability of a surface system to reduce and dissipate the energy of an impacting body.

As used herein, the term "drop height" is the vertical distance of the headform above the safety cushion from which the headform is accelerated under gravity before impacting the safety cushion.

2. Description of Background Art

Shock-absorbing safety cushions and mat assemblies are greatly needed in many applications where equipments are located, such as in school yards and playgrounds. In these areas, severe injuries have been caused to persons by losing foothold from an equipment and by falling from play apparatus onto a hard ground surface, such as an asphalt or concrete surface. As a result, many efforts are being made to find an improved surface covering for playgrounds, recreational and industrial floors or the like, which will give protection against such injuries.

Indeed, the Consumer Product Safety Commission has determined that the risk of serious injury due to a head-first fall is minimal when the amount of force the head absorbs is 200 g's or less.

A child landing on asphalt from a height of up to twelve feet would impact with a force of several thousand g's. In fact, hitting asphalt from a height of only two inches incurs a g-force of over 300.

Various types of surface coverings have been attempted to solve this problem. Such efforts include mats made of resilient material, rubber granules or ground up tires, but none, prior to the present invention, was able to reduce the impact force of a headform to less than 200 g's from a drop height of up to twelve feet.

Thus, there is a continuous and urgent need for chemical composition and design for a safety cushion and mat assembly that can be used to reduce the impact g-force to the head to less than 200 g's from a drop height of up to twelve feet.

Moreover, a need also exists for chemical composition and design for anchoring system to secure the safety cushion and mat assembly to the ground, thereby reducing the danger of slippage and theft by having the safety cushion or mat assembly pulled up.

SUMMARY OF THE INVENTION

The present invention provides chemical compositions and designs useful for fabricating safety cushion and mat assemblies which have effective protection against injuries to persons falling from a height of up to twelve feet by reducing the impact g-force to less than 200 g's.

The present invention specifically provides chemical compositions and design useful for fabricating safety cushions and mat assemblies conforming to ASTM Standard Specification F 1292-91 by performing the Test Method F355, Procedure C (metal headform) from a drop height of up to twelve feet.

The present invention further provides chemical compositions and designs useful for fabricating the reinforced rubber anchor for securing the safety cushion and mat assemblies to the ground.

In addition, the present invention provides a safety cushion system comprising a mat formed from an assembly of safety cushions and reinforced rubber anchors of the above compositions that resists wear, weather, cutting, puncture, pulling and fire.

Specifically, the present invention provides compositions useful for fabricating safety cushions and mat assemblies and has a shore hardness of about 68±3 wherein the composition comprises an ethylene/propylene rubber, an activator, an accelerator, a plasticizer, a vulcanizer, a filler, and optionally a colorant or a whitener.

The present invention also provides compositions useful for fabricating the reinforced rubber anchor for securing the safety cushion and mat assemblies to the ground and has a shore hardness of about 73 wherein the composition comprises a natural rubber, a processing aid agent, a plasticizer, a filler, an antioxidant, an antiozonant, an activator, an accelerator, a vulcanizer, an inhibitor and optionally a colorant or a whitener.

Specifically, the present invention provides a rubber anchor comprising a rounded head portion with a diameter of about 1.2–2.2 inches, preferably 1.5–1.8 inches, and a thickness of about 0.15–0.5 inches, preferably about 0.25–0.4 inches; a bolt portion of about 3–6 inches in length, preferably about 4–5.7 inches most preferably about 4.6–5.4 inches, and a diameter of about 0.4–0.8 inches, preferably 0.5–0.7 inches; preferably the bolt portion further has indentations, preferably in the form of a plurality of inverted triangles, preferably about 0.7–0.8 inches each in length. In addition, preferably a metal washer is embedded in the bottom of the rounded head portion to provide further anchoring support in preventing the impact attenuation safety cushion and system be pulled up from the ground.

In addition, the present invention provides a plastic anchor comprises a rounded head portion with a diameter of about 1.2–2.2 inches, preferably about 1.4–1.8 inches, and a thickness of about 0.15–0.5 inches, preferably about 0.25–0.4 inches; a bolt portion of about 1.5–5 inches, preferably about 2–4.5 inches, and a diameter of about 0.2–0.8 inches, preferably about 0.3–0.6 inches; a stopper portion with tapered end molded to the bolt portion, the diameter of the stopper portion is about 0.4–1 inch, preferably about 0.5–0.9 inches. The stopper portion and a lower portion of the bolt portion are inserted in a plastic cylinder with a narrower neck region upon which the stopper portion of the bolt engages. The anchor, including the cylinder, is made of any common plastic materials such as polyethylene, polypropylene, polycarbonate, polyester, fiberglass or the like. The cylinder is of a length of about 1.5–5 inches.

Moreover, the present invention provides a method of fabricating safety cushions and mat assemblies whereby during the fabricating process, the material does not stick to the mold, has good hot tear strength and outstanding demolding capability.

BRIEF DESCRIPTION OF THE DRAWINGS

The above and other features of the present invention may be more fully understood from the following detailed description, taken together with the accompanying drawings, wherein similar characters refer to similar elements throughout and in which:

FIG. 3a is a cross sectional elevational view of a safety cushion secured to a concrete slab;

FIG. 3b is similar to FIG. 3a but shows a metal washer embedded in the rounded head of the anchor installed in a concrete slab;

FIG. 4 is a partially cutaway bottom view of the safety cushion;

FIG. 5a is a cross sectional elevational view of a safety cushion secured to a concrete slab with a stopper-anchoring system; and FIG. 5b shows the safety cushion system of FIG. 5a under impact from a fallen object.

DESCRIPTION OF THE PREFERRED EMBODIMENT

Figure 1:
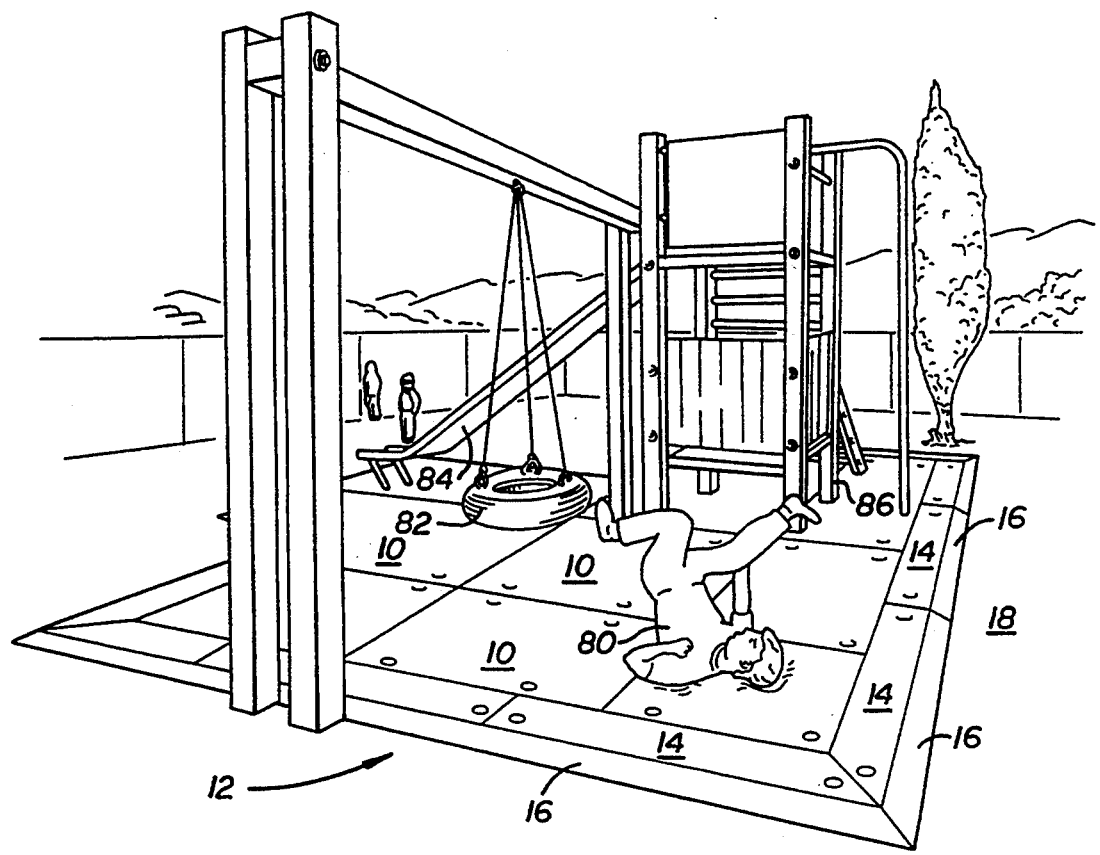
FIG. 1 is a pictorial view of playground equipment installed on safety cushions made according to the present invention.

A safety cushion 10 embodying the features of the present invention is shown in FIGS. 1–5. Referring to FIG. 1, a number of individual safety cushions 10 are assembled to form a mat 12 to be placed underneath playground equipment. The mat 12 surrounds the playground equipment such that a child 80 falling from a tire swing 82, a slide 84 or an elevated structure 86 will come into contact with the mat 12 which will prevent serious injury by absorbing the shock from the fall.

Although the exemplary embodiment of the safety cushions disclosed herein are shaped primarily in a square, the cushions may be made in any shape and accordingly the mat 12 may be shaped to fit any desired area. Border pieces 14 having wedge shaped ramps 16 may also be added to the mat to provide a trip free transition from an area 18 surrounding the mat 12. Referring to FIG. 4, the underside of the safety cushion 10 is seen to comprise a plurality of rectangular pockets 20 having a waffle construction. Preferably, the pockets 20 are square. The pockets 20 are formed by a series of parallel ribs 22 which are molded integrally with and perpendicular to the underside of the safety cushion 10 and a series of parallel cross-ribs 24 which are molded integrally with the underside of the safety cushion 10 in the same manner as the ribs 22, but perpendicularly intersect the ribs 22. Safety cushion 10 is also bounded by end walls 26.

The safety cushion 10 has a surface layer 28 that is supported by the ribs 22, cross-ribs 24 and end walls 26. Except for the ramps 16 of the border pieces 14, the ribs 22, cross-ribs 24 and end walls 26 generally have the same vertical depth so that all share in supporting the surface layer 28 when the safety cushion 10 is resting on a relatively even surface, such as a concrete slab 70. Also, since the ribs 22, cross-ribs 24 and end walls 26 are of equal depth, the pockets 20 have co-planar lower edges 30. This gives the pockets a suction cup characteristic which enables them to establish a connection with the surface 70 covered by the cushion, thereby assisting in holding the cushion to the surface. Preferably, the top of the surface layer 28 is formed with a plurality of individual raised buttons 34 to prevent slippage. In the preferred embodiment, the raised buttons are formed in parallel rows and the ribs 22 intersect the underside of the safety cushion 10 at a location between a respective pair 23 of said parallel rows of raised buttons 34 (see FIG. 2). Similarly, the cross-ribs 24 intersect the underside of the safety cushion 10 at a location between a respective pair 25 of parallel rows.

Figure 2:
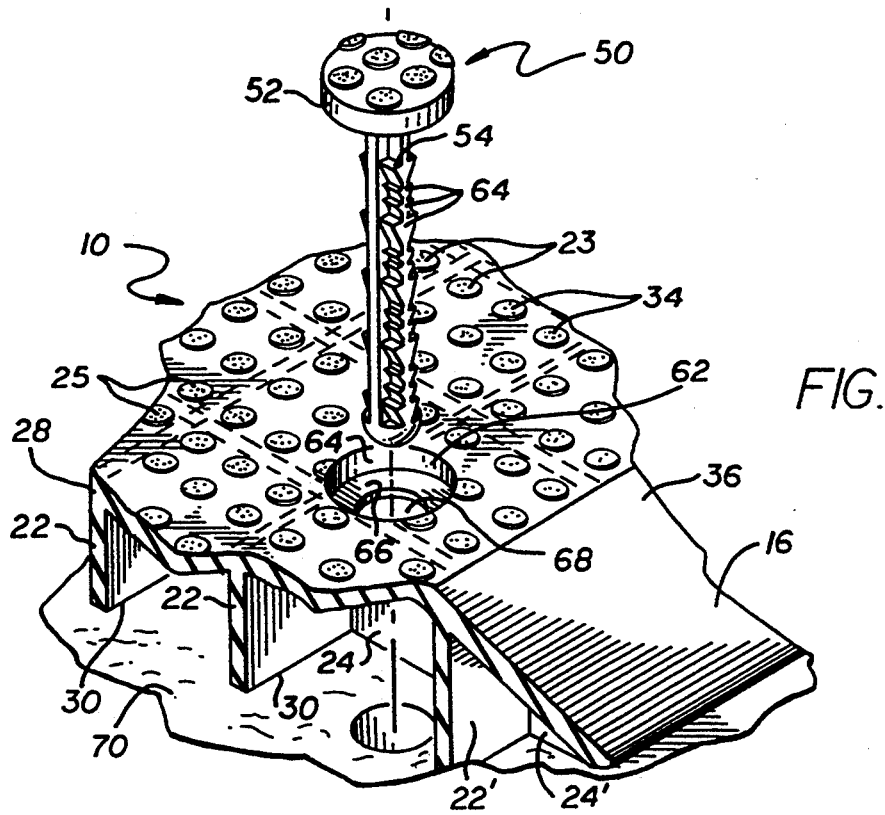
FIG. 2 is an exploded perspective view of a safety cushion having a ramp portion, the safety cushion being cutaway to show its inner construction.

The wedge shaped ramp 16 of the border piece 14 also has a waffle construction (see FIG. 2). In this case, corresponding ribs 22' of the ramp 16 are reduced in depth to support a ramp surface layer 36 of the ramp on the surface 70. Corresponding cross-ribs 24' of the ramp are tapered to also support the ramp surface layer 36.

Referring to FIG. 3a, the lower edge 30 of each rib 22 contacts the surface 70. Each rib also has an upper surface 40 molded to the surface layer 28 of the underside of safety cushion 10 and two walls 42, 44. Preferably, the walls 42, 44 are tapered at about a 3° angle, with the walls 42, 44 converging as they approach the lower edge 30. Each cross-rib 24 of the safety cushion may be similarly molded.

In the preferred embodiment, each safety cushion 10 is a 48 inch by 48 inch square having a total depth of 1¾ and 2¾ inches for impact attenuation from drop heights of up and twelve feet, respectively. The surface layer 28 is ¼ inch thick including 1/16 inch raised buttons 34. Each raised button 34 has a ⅜ inch diameter and there are four raised buttons per square inch on surface layer 28. The ribs 22 and cross-ribs 24 are spaced at 1 inch intervals and are ½ and 1 inch in height for the up to twelve feet drop height attenuation safety cushion, respectively. The lower edge 30 of the ribs 22 and cross-ribs 24 is 1/10 of an inch wide and the walls of the ribs and cross-ribs diverge at a 3° angle from vertical from the lower edge 30. The end walls 26 are 1/20 and 1/10 inch thick for the up to twelve feet drop height attenuation safety cushion, respectively.

Anchors 50, shown in FIGS. 2–5, are used to secure the safety cushions to a supporting surface. Each anchor 50 includes a head 52 integrally molded to a bolt portion 54. The anchor 50 is preferably made from a different rubber compound as the safety cushion 10. The anchor 50 may be injection molded around a nylon cord 56 or other material located along the axis of the bolt portion 54 to improve the tensile properties of the anchor 50. The head 52 may be formed with raised buttons 60, similar to the raised buttons 34 on the surface layer 28 of the safety cushion 10.

In FIG. 3b, a metal washer 100 is shown embedded between the head 52 and the bolt portion 54 to provide further anchoring support to prevent the impact attenuation safety cushion and system from being pulled up from the ground.

The safety cushion 10 may be molded with a recessed portion 62 for each anchor 50. The recessed portion 62 includes a wall 64 and a seat 66 defining an opening 68 for receiving the bolt portion 54 of the anchor, but not the head 52 of the anchor. The thickness of the wall 64 and the seat 66 is preferably about ¼ and ½ inch for the up to twelve feet drop height attenuation safety cushion, respectively. The depth of the recessed portion 62 should be slightly greater than the thickness of the head 52 of the anchor 50 to prevent tripping over the anchor when it is installed in the safety cushion.

In the case of the 48 inch by 48 inch safety cushion referred to earlier, four anchors are sufficient to secure the cushion to a supporting surface. Preferably, an anchor is placed in each corner 5 inches from each edge. For smaller safety cushions, e.g., 24 inches by 24 inches, two anchors may be used along a center line of the cushion, each anchor being 4 inches inward from an edge of the cushion. For example, in a seven feet drop height attenuation safety cushion system, each anchor is about 4 11/16 inches long, the head of each anchor is about 1¾ inches in diameter and each bolt portion is at least 9/16 inches in diameter. On the other hand, for a twelve feet drop height attenuation safety cushion system, each cushion is preferably about 5¾ inches long.

Referring to FIG. 3a, the safety cushion is shown installed on the concrete slab 70. The anchor 50 is inserted through the recessed portion 62 of the safety cushion 10 and may be glued to the seat 66. A hole 72 is drilled into the concrete slab 70. Preferably, the hole in the slab is approximately twice the diameter of the bolt portion 54 of the anchor 50. The anchor is then grouted into the hole in the concrete slab. Preferably, the bolt portion 54 has indentations 58 to prevent the anchor from pulling out of the grout and concrete slab.

Referring to FIG. 5a, the safety cushion is shown installed on the concrete slab 70 secured by the anchor 50a. The anchor 50a is made of any common plastic material such as polyethylene, polypropylene, polycarbonate, polyester, fiberglass or the like. The anchor 50a further comprises a rounded head portion 52a with a diameter of about 1.2–2.2 inches, preferably about 1.4–1.8 inches, and a thickness of about 0.25–0.4 inches, preferably about 0.25–0.4 inches; a bolt portion 54a of about 1.5–5 inches, preferably about 2–4.5 inches, and a diameter of about 0.2–0.8 inches, preferably about 0.3–0.6 inches; a stopper portion 102 with tapered end 104 molded to the bolt portion, the diameter of the stopper portion 102 is about 0.4–1 inch, preferably about 0.5–0.9 inches. The anchor 50a is inserted through the recessed portion 62 of the safety cushion 10 and may be glued to the seat 66. A hole 72 is drilled into the concrete slab 70. Preferably, the hole in the slab is approximately 2–3 times the diameter of the bolt portion 54a. A plastic cylinder 106 with retaining arms 108 at the top portion of the cylinder is then grouted into the hole in the concrete slab. Preferably, the cylinder 106 has indentations 107 at the outside to prevent the cylinder from pulling out of the grout and concrete slab. The anchor 50a is then inserted into the plastic cylinder and retained in it by the stopper portion 102 engaging the neck region 110 of the cylinder. Preferably, the cylinder is of a length of about 1.5–5 inches.

Referring to FIG. 5b, the safety cushion system of FIG. 5a is shown under impact from a fallen object. Upon impact, the impacting force drives the bolt portion 54a of the anchor 50a into the plastic cylinder 106 along the inside cylindrical surface 112. The ribs 22 and 24 of the safety cushion surrounding the anchor compress under the impact, when the impacting force is removed, the anchor returns to its resting position with the stopper portion moves back upward along the inner cylindrical surface 112 of the plastic cylinder 106 and engages at the neck portion 110 again. This impact activated attenuation anchor system further improves the safety and performance of the safety cushion system in reducing injuries to persons falling from a height of up to twelve feet.

In the present invention, it has been found that a specific combination of compositions is required to fabricate the safety cushion and mat assembly so as to reduce the impact force of a headform to less than 200 g's from a drop height of up to twelve feet.

The ethylene/propylene rubber used in the safety cushion composition may be of any type, but is preferably of the non-reactive type and preferably, a sequence teropolymer polymerized from ethylene, propylene with about 1–6% diene (EPDM). Exemplary ethylene-propylene rubber compounds include BUNA EPDM, such as AP 147 sold by Huls America. The ethylene/propylene rubber may be used alone in the composition or as a mixture with other compounds, such as a different olefin or polyolefin.

A variety of activators appropriate to promote the curing of the present safety cushion compositions may be used. Such activators include zinc oxide, stearic acid, and preferably, a combination thereof.

A variety of accelerator appropriate to accelerate the curing of the present safety cushion compositions may be used. Such accelerators include N-oxydiethylene benzothiozole-2-sulfenamide, sold as Amax commercially; tetraethylthiuram disulfide, known as methyl TUADS, and preferably, a combination thereof.

A plasticizer, preferably of the liquid plasticization material appropriate to plasticize the present safety cushion compositions may be used. Exemplary are naphthenic hydrocarbon oil, known commercially as cyclolube 413 oil, paraffinic oil known commercially as Sunpar 2280 oil, naphthenic oils known commercially as Shellflex 371 or the like.

The present safety cushion compositions also include a vulcanization agent, preferably sulfur.

For many applications, the safety cushion compositions are preferably filled, and preferably contains loading of about 100–300 parts of filler per 100 parts of ethylene/propylene rubber. The filler may comprise one or more of the several conventional fillers, preferably is the use of a grinded form of rubber from tires known commonly as #1 Buffing. Other fillers preferably employed in lesser amounts in combination with #1 buffing as the filler include carbon blacks, known commercially as N650 Black, and N300 Black. If the color for the cushion is desired to be other than black, then optionally, a colorant, such as red or yellow iron oxide, or a whitener, such as titanium dioxide may be used.

Optionally, a processing aid agent appropriate to assist processing of the present safety cushion compositions may be used. Such processing aid agents include common blend of rubber compatible non-hardening synthetic resins and fatty acid soaps, known commercially as Struktol EP 52, from Struktol Co.

Safety cushion compositions of the present invention may be prepared by any conventional method. For example, the safety cushion may be compression molded. In general, the uncured rubber of the composition is being placed in the mold cavity before the mold is closed. The mold is then assembled as far as possible and placed in a hydraulic press. The press completes the closing of the mold, causes the rubber to flow and completely fill the cavity. After the mold has been under pressure for the prescribed amount of time at the designated temperature, the mold is removed from the pressure and disassembled to remove the rubber parts. Molding conditions for the safety cushion of the present invention may range from about 300–2000 psi pressure, preferably about 1200 psi per cavity area, 270° to 360° F. temperature, preferably 300° F., cure time from five minutes to one hour, preferably about 15 minutes. Any suitable compression molding machine equipped with the appropriate mold may be employed.

The ratio between the various ingredients need to be controlled. In the following disclosure, unless otherwise stated, all parts by weight of the ingredients are in reference to the total weight of the ethylene/propylene rubber (i.e. the total weight of the ethylene/propylene rubber is taken to be 100 parts by weight) used in the composition. However, about 70–130 parts by weight of the ethylene/propylene rubber can be used in the safety cushion composition.

Whatever activators are employed, generally are applied at levels sufficient to provide sufficient activity and processing stability to improve long term high heat exposure of the safety cushion composition under anticipated molding conditions. Generally amount between 1–10 parts by weight is sufficient, preferably about 5–8 parts by weight.

The amount of accelerator used are sufficient to provide a reasonable rate of curing of the present safety cushion composition. Generally amount between 1–10 parts by weight is sufficient, preferably about 2–6 parts by weight.

A plasticizer is used to enhance the processing characteristics of the resulting safety cushion composition. The plasticizer is used in an amount sufficient to give the desired plasticizing efficiency and performance under anticipated molding conditions. Usually amount between 30–70 parts by weight is sufficient, preferably about 40–50 parts by weight.

Whatever vulcanization agent is used, is generally applied at levels sufficient to vulcanize the safety cushion composition under anticipated molding conditions. Usually amount between about 0.1–3 parts by weight is sufficient, preferably about 0.8–1.2 parts by weight.

The total amount of filler used may vary from 100–300 parts by weight, and preferably about 170–230 parts by weight. Also, preferably, between about 90–110 parts by weight is a grinded form of rubber from tires such as #1 Buffing. If the color of the cushion is desired to be other than black, then the appropriate colorant will be used in place of the carbon black in an amount sufficient to give the cushion the desired color.

Optionally, a processing aid agent may be used to assist processing of the present safety cushion composition.

The processing aid agent if used, will be generally in an amount of between 1–10 parts by weight, preferably 2–6 parts by weight.

The present invention also relates to compositions useful for fabricating the anchor used to secure the safety cushions and mat assembly to the ground to prevent cushion dislocation or theft.

The natural rubber used in the composition of the anchor may be of any type, but is preferably of the non-reactive type. Exemplary natural rubber include SIR 20, an Indonesian rubber with dirt content of less than 0.2% by weight, #1 smoked sheets which is a processed bulk of natural rubber lattice or preferably a combination thereof. To improve the processing properties of the natural rubber, a styrene-butadiene resin known commercially as Pliolite S6B is added. The natural rubber may be used alone in the composition or as a mixture with other compounds, such as a synthetic rubber.

A variety of processing aid agents appropriate to processing of the present anchor composition may be used. Such processing aid agents include pentachlorothiophenol, a peptizer, commercially sold as Renacit #7, alkyl phenol formaldehyde resin, commercially known as Sp 1068 resin, or a combination thereof.

A plasticizer, preferably of the liquid plasticization material appropriate to plasticize the present anchor compositions may be used. Exemplary is extracts from pine, known commonly as pine tar medium.

For many applications, the anchor compositions are preferably filled, and preferably contains loading of about 10 to 150 parts of filler. The filler may comprise one or more of the several conventional fillers preferably is the use of carbon black and amorphous silica. Exemplary are carbon blacks known commercially as N339 Black and amorphous silica known commercially as Hisil 243, respectively. If the color desired for the anchor is other than black, then optionally a colorant, such as red or yellow iron oxide, or a whitener, such as titanium dioxide can be used in place of the carbon black in the composition.

To improve the resistance to sunlight and weather of the safety cushion, an antioxidant together with an antiozonant are added to the anchor compositions. Antioxidant, such as polymerized 1,2-dihydro-2,2,4-trimethylquinoline, or N-phenyl-N(1,3,dimethylbutyl)p-phenylene diamine, known commercially as Agerite Resin D and Flexzone 7F respectively, and antiozonant, known commercially as Sunproof Extra TM are generally preferred.

A variety of activators appropriate to promote the curing of the present anchor compositions may be used. Such activators include zinc oxide, stearic acid, and preferably, a combination thereof.

A variety of accelerator appropriate to accelerate the curing of the present anchor compositions may be used. Such accelerators include 4-morpholinyl-2-benzothiazole disulfide, known commercially as Morfax, 4',4'-dithiodimorpholine, known commercially as Sulfusan R and methyl TUADS.

The present anchor compositions also include a vulcanization agent, preferably sulfur treated with magnesium carbonate, known commercially as Spider sulfur.

To control the rate of vulcanization and to improve processing of the anchor composition, vulcanized inhibitor, such as N-cyclohexylthiophthalamide, known commercially as P.V.I. is also included in the composition.

Anchor compositions of the present invention may be prepared by any conventional method. The natural rubber, processing aid agent, plasticizer, filler, antioxidant, antiozonant and the stearic acid activator were first mixed together and stir for 24 hours to make a master batch. After the master batch was made, the rest activators, accelerator, vulcanizer and inhibitor were then added to the mixture. The anchor composition may be compression molded similar to the safety cushion compositions as described earlier in this application. Molding conditions for the anchor compositions may range from about 300–2000 psi pressure, preferably about 1200 psi per cavity area, 270° to 360° F. temperature, preferably 300° F., cure time from five minutes to one hour, preferably about 15 minutes. Any suitable compression molding machine equipped with the appropriate mold may be employed.

Alternatively, the anchor can be made of any common plastic material, such as polyethylene, polypropylene, polycarbonate, polyester, fiberglass or the like. The plastic anchor may be prepared by any conventional method, such as injection molding on heat pressing.

The ratio between the various ingredients need to be controlled. In the following disclosure, unless otherwise stated, all parts by weight of the ingredients are in reference to the total weight of the natural rubber (i.e. the total weight of the natural rubber is taken to be 100 parts by weight) used in the composition.

The total amount of natural rubber used is generally taken to be 100 parts but 90–110 parts by weight of the natural rubber may be used, in the composition. The natural rubber may vary from 0–100 parts by weight of SIR 20 or #1 smoked sheets, and preferably a mixture of a ratio between 0.8–1.2. The amount of processing aid agents used to improve the processing of the anchor compositions generally is about 2–20 parts by weight, preferably 8–12 parts by weight.

A plasticizer is used in an amount sufficient to give the desired plasticizing efficiency and performance under anticipated molding conditions. Usually amount between 0.5–10 parts by weight is sufficient, preferably about 1–3 parts by weight.

The total amount of filler used may vary from 10–100 parts by weight, preferably about 60–80 parts by weight. If the color of the anchor is desired to be other than black, then the appropriate colorant will be used in place of the carbon black in an amount sufficient to give the cushion the desired color.

Whatever antioxidant and antiozonant is used, is generally applied at levels sufficient to provide the necessary resistance to sunlight and weather of the anchor. Usually amount of antioxidant or antioxonant between 1–10 parts by weight is sufficient, preferably about 1–5 parts by weight.

The amount of activator employed are at levels sufficient to provide sufficient activity and processing stability to improve long term high heat exposure of the anchor composition under anticipated molding conditions. Generally, amount between 3–10 parts by weight is sufficient, preferably 6–8 parts by weight.

The amount of accelerator used are sufficient to provide a reasonable rate of curing of the present anchor composition. Generally, amount between 1–6 parts by weight is sufficient, preferably about 2–4 parts by weight.

Whatever vulcanization agent is used, is generally applied at levels sufficient to vulcanize the safety cushion composition under anticipated molding conditions. Usually amount between about 0.1–3 parts by weight is sufficient, preferably about 0.4–0.8 parts by weight.

The amount of pre-vulcanized inhibitor used are sufficient to maintain the appropriate rate of vulcanization prior to compression molding. Generally, amount between about 0.01 to 3 parts by weight is sufficient, preferably about 0.05–0.15 parts by weight.

The present invention is not restricted to the above ingredients but may include other ingredients which do not detract from impact force reduction properties of the safety cushion and the anchor. Accordingly, other natural rubber polymers, organic or inorganic materials or the like may be added under the above conditions.

The following non-limiting examples further illustrate the present invention. All parts are by weight in reference to the total weight of the natural rubber used in the composition unless otherwise indicated.

The "impact attenuation test" referred to following examples is the same as that of ASTM F 355 Test Method for Shock Absorbing Properties of Playing Surface Systems and Materials and the procedure used as specified in paragraph 4 of ASTM Standard Specification F 1292-91, which is hereby incorporated by reference. The test generally involves measuring the impact force of a metal headform according to test method F 355, Procedure C at various drop heights and test temperatures. First, the test apparatus is calibrated to zero. Laboratory samples (safety cushion) fabricated using a specific composition was preconditioned at 50±10% relative humidity 72°±5° F. (23°±3° C.) for a minimum of 24 hours prior to beginning testing. For samples to be tested at different temperatures, the samples were conditioned at such temperature for 4 hr minimum. Testing were started within 1 minute of taking samples out of the environmental chamber with a time interval between drops of 3±0.25 minutes shall be conditioned. After the test apparatus was calibrated to zero, the metal headform was then raised to the desired drop height. The preconditioned safety cushion sample to be tested is then placed on the floor directly underneath the metal headform. The metal headform was then released from the drop height and allowed to impact the sample under gravity. The deceleration force in g's was then recorded by the recording system of the apparatus. The impact test was repeated for different heights in whole foot increments, i.e. 1,2,3 . . . n, that give a deceleration force of 200-g max or less. The impact test consists of three drops at the same impact site, at each height, and the average of the deceleration force recorded for the second and third drops are used to determine the impact attenuation. If the average of the second and third deceleration force recorded is less than or equal to 200 g's, then the safety cushion is considered safe within the meaning of the term as used herein.

EXAMPLE 1

Safety cushion was prepared from the composition indicated in table 1. Composition 1 is a starting formulation and has a shore hardness of only 50±5. When the impact attenuation test was performed on the safety cushion fabricated using composition 1, the impact force is 220 g for the first drop test.

TABLE 1

| SAFETY CUSHION COMPOSITION 1 SHORE HARDNESS = 50 ± 5 | | |
|---|---|---|
| | INGREDIENTS | PARTS BY WEIGHT |
| Polymer | Royalene 509[a] | 64.89 |
| | Royalene 505[b] | 19.15 |
| | SBR 1712[c] | 19.20 |
| Activator | Zinc Oxide | 4.00 |
| | Stearic acid | 1.00 |
| Accelerator | Amax[d] | 1.50 |
| | Butyl Zimate[e] | 1.00 |
| | D.P.G.[f] | 0.60 |
| | Cumate[g] | 0.40 |
| Plasticizer | Cyclolube 85 oil[h] | 105.88 |
| Vulcanizer | Sulfur | 3.50 |
| Processing aid | Struktol WB 212[i] | 1.00 |
| Filler | Ionic clay | 58.82 |
| | #1 Buffings[j] | 117.64 |
| | N660 Black[k] | 59.29 |
| | Austin Black[l] | 29.41 |

[a]Royalene 509, 70/30 EP ratio, ENB third monomer, Uniroyal Chemical
[b]Royalene 505, 57/43 EP ratio, ENB third monomer, Uniroyal Chemical
[c]SBR 1712, Styrene Butadiene
[d]N-oxydietylene benzothiazole -2-sulfenamide
[e]Zinc dibutyldithiocarbamate, R.T. Vanderbilt
[f]Symmetrical diphenylguanidine, American Cyanamid
[g]Copper dimethyldithiocarbamate, R.T. Vanderbilt
[h]Napthenic hydrocarbon oil
[i]Blend of rubber compatible non-hardening synthetic resins and fatty acid soaps
[j]Grinded form of rubber from tires
[k]Carbon, J.M. Huber
[l]Ground coal, Harwick

EXAMPLE 2

Safety cushion was prepared from the composition indicated in Table 2. The Buffing was removed from composition 2 and the filler Austin Black was replaced with clay. Safety cushion fabricated from composition 2 has a shore hardness of 60±5. When the impact attenuation test was performed on the safety cushion fabricated using composition 2, the impact force is 168, 215 and 225 g's for the first, second and third drop test respectively.

TABLE 2

| SAFETY CUSHION COMPOSITION 2 SHORE HARDNESS = 60 ± 5 | | |
|---|---|---|
| | INGREDIENTS | PARTS BY WEIGHT |
| Polymer | EPCAR ® 5875[m] | 80.0 |
| | Royalene 400[n] | 80.0 |
| Activator | Zinc oxide | 20.0 |
| | Stearic acid | 0.5 |
| Accelerator | Amax | 1.5 |
| | Methyl TUADS | 1.0 |
| | Butyl Zimate | 0.4 |
| | Carbowax 3350 | 4.0 |
| Processing aid | #371 oil | 20.0 |
| Vulcanizer | Sulfur | 1.0 |
| Filler | Ionic clay | 75.0 |
| | Nucap 100[o] | 75.0 |
| | N550 Black | 10.0 |

[m]EPCAR ® 5875 EPDM from Goodrich
[n]Royalene 400 68/32 Ethylene/propylene ratio
[o]Nucap 100 Mercapto silane, functional hydrated aluminum silicate, J.M. Huber

EXAMPLE 3

Safety cushion was prepared from the composition indicated in Table 3. Safety cushion fabricated from composition 3 has a shore hardness of 75±2. When the impact attenuation test was performed on the safety cushion fabricated using composition 3, the impact force is 198, 231 and 236 g's for the first, second and third drop test respectively.

TABLE 3

| SAFETY CUSHION COMPOSITION 3 SHORE HARDNESS = 75 ± 2 | | |
|---|---|---|
| | INGREDIENTS | PARTS BY WEIGHT |
| Polymer | Royalene 400 | 50.0 |
| | EPCAR ® 5875 | 50.0 |
| | Royalene 622[p] | 70.0 |
| Activator | Zinc oxide | 5.0 |
| | Stearic acid | 1.0 |
| Accelerator | Methyl zimate | 1.5 |
| | MBTS[q] | 1.0 |
| | Monex[r] | 1.5 |
| Plasticizer | Cyclolube 85 oil[s] | 80.0 |
| Filler | Omyacarb 10[t] | 100.0 |
| | N650 Balck | 80.0 |
| | N774 Black | 200.0 |
| Vulcanizer | Sulfur | 2.0 |

[p]Royalene 622 75/25 Ethylene/propylene ratio
[q]MBTS: mercaptobenzothioazol disulfide
[r]Monex: tetramethylthiuram monosulfide, Uniroyal chemical
[s]Cyclolube 85 oil: naphthenic hydrocarbon oil, Witco Golden Bear div.
[t]Omyacarb 10: calcium carbonate

EXAMPLE 4

Preferred safety cushion compositions with a shore hardness of 68±3 were prepared from compositions indicated in Table 4.

TABLE 4

| SAFETY CUSHION COMPOSITION 4, 5 and 6 SHORE HARDNESS = 68 ± 3 | | | |
|---|---|---|---|
| | No. 4 | No. 5 | No. 6 |
| POLYMER | | | |
| Royalene 400 50 | | | |
| Royalene 512 75 | | Buna AP147 100 | Buna AP147[u] 100 |
| ACTIVATOR | | | |
| Zinc Oxide | 5.0 | 5.0 | 5.0 |
| Stearic acid | 1.5 | 1.5 | 1.5 |
| PLASTICIZER | | | |
| HPO 603 oil | 20 HPO 603 oil | 45 | Cyclolube 413 oil[v] 45 |
| VULCANIZER | | | |
| Sulfur | 1.0 | 1.0 | 1.0 |
| ACCELERATOR | | | |
| Amax | 3.0 | 3.0 | 3.0 |
| Methyl TUADS | 0.5 | 0.5 | 0.5 |
| FILLER | | | |
| #1 Buffings | 100 | 100 | 100 |

TABLE 4-continued

SAFETY CUSHION COMPOSITION 4, 5 and 6
SHORE HARDNESS = 68 ± 3

|  | No. 4 | No. 5 | No. 6 |
|---|---|---|---|
| N650 Black | 45 | 45 | 45 |
| N300 | 50 | 50 | 50 |
| PROCESSING AID AGENT |  |  |  |
| Struktol EP52[w] | 5 | (Wigtack 95) 1 |  |

[u]Buna AP147: Ethylene/propylene rubber, Huls America
[v]Cyclolube 413 oil: Naphthenic hydrocarbon oil, from Witco Golden Bear
[w]Struktol EP52: blend of rubber compatible non-hardening synthetic resins and fatty acid soaps, from Struktol Composition 4 comprises the polymers of Royalene 400 & Royalene 512. Composition 6, on the other hand comprises the polymer BUNA AP 147. Both compositions 4 and 5 comprise the plasticizer of H.P.O 603 oil. Composition 6 comprises the BUNA AP 147 polymer in combination with the plasticizer Cyclolube 413 oil. Table 4A summarizes the impact attenuation test conducted on safety cushion fabricated using compositions 4-6. As can be seen in Table 4A, safety cushion fabricated from composition 4 failed the impact attenuation test at high temperature (120° F.), while the safety cushion fabricated from composition 5 failed the impact attenuation test at low temperature (30° F.). Only safety cushion fabricated from composition 6 passed the impact attenuation test at low, room and high temperatures.

TABLE 4A

IMPACT ATTENUATION TEST CONDUCTED
ON SAFETY CUSHIONS
USING COMPOSITIONS 4, 5 and 6

|  | COMPOSITIONS | | |
|---|---|---|---|
|  | No. 4 | No. 5 | No. 6 |
| A. ROOM TEMPERATURE |  |  |  |
| Drop Test | Impact Attenuation (g) | | |
| No. 1 | 172 | 167 | 164 |
| No. 2 | 194 | 178 | 185 |
| No. 3 | 204 | 198 | 194 |
| Average of (2 + 3) 199 |  | 188 | 189.5 |
| B. LOW TEMPERATURE (30° F.) |  |  |  |
| Drop Test | Impact Attenuation (g) | | |
| No. 4 | 180 | 197 | 185 |
| No. 5 | 192 | 205 | 191 |
| No. 6 | 198 | 200 | 196 |
| Average of (2 + 3) 195 |  | 202.5 | 193.5 |
| C. HIGH TEMPERATURE (120° F.) |  |  |  |
| Drop Test | Impact Attenuation (g) | | |
| No. 7 | 164 | 159 | 148 |
| No. 8 | 208 | 188 | 176 |
| No. 9 | 220 | 199 | 194 |
| Average of (2 + 3) 214 |  | 193.5 | 185 |

EXAMPLE 7

Anchor was prepared from the composition indicated in Table 5. Anchor fabricated from composition 7 has a shore hardness of 76±3.

TABLE 5

COMPOSITION OF THE ANCHOR
SHORE HARDNESS = 76 ± 3

|  | INGREDIENTS | PARTS BY WEIGHT |
|---|---|---|
| Polymer | SIR 20[1,A] | 50.0 |
|  | #1 Smoked sheets[2,A] | 50.0 |
| Processing | Pliolite S6B[3,A] | 6 |
| aid agents | Renacit #7[4,A] | 0.4 |
|  | SP1068 resin[5,A] | 3 |
| Plasticizer | Pine tar medium[6,A] | 2 |
| Filler | N339 Black[7,A] | 60 |
|  | Hisil 243[8,A] | 10 |
| Antioxidant | Agerite resin D[9,A] | 1.5 |

TABLE 5-continued

COMPOSITION OF THE ANCHOR
SHORE HARDNESS = 76 ± 3

|  | INGREDIENTS | PARTS BY WEIGHT |
|---|---|---|
|  | Flexzone 7F[10,A] | 1.5 |
| Antiozonant | Sunproof extra[11,A] | 3 |
| Activator | Stearic acid[A] | 2.5 |
|  | Zinc oxide[B] | 5 |
| Accelerator | Morfax[12,B] | 1.5 |
|  | Sulfasan R[13,B] | 0.8 |
|  | Methyl TUADS[B] | .4 |
| Vulcanizer | Spider Sulfur[14,B] | 0.6 |
| Inhibitor | P.V.I.[15,B] | 0.1 |

[1]SIR 20: Standard indonesian rubber with dirt content of ≦0.2% by weight
[2]#1 Smoked sheets: processed bulk of natural rubber lattice;:
[3]Pliolite S6B: Styrene butadiene resin;
[4]Renacit #7 Pentachlorothiophenol, a peptizer;
[5]SP1068 resin: Alkyl phenol formaldehyde resin, a tackifier resin;
[6]Pine tar medium: extracts from pine;
[7]N339 black: reinforced carbon black used in tire tread and hose belts;
[8]Hisil 243: precipitated hydrated amorphous silica;
[9]Agerite resin D: polymerized 1,2-dihydro-2,2,4 trimethylquinoline;
[10]Flexzone 7F: N-phenyl-N (1,3,dimethyl butyl) P- phenylene diamine;
[11]Sunproof extra: mixture of waxy material from Uniroyal Chemical;
[12]Morfax: 4-morpholinyl -2-benzothiazole disulfide;
[13]Sulfasan R: 4',4'-dithiodimorpholine;
[14]Spider sulfur: sulfur treated with magnesium carbonate;
[15]P.V.I.: N-cyclohexylthiophthalamide, pre-vulcanized inhibitor;
[A]Ingredients were mixed together to form a master batch.
[B]After master batch A has been aged for 24 hours, ingredients were then added for processing.

The foregoing examples are intended to illustrate, without limitation, the chemical composition of the present invention, their preparation and use for fabricating safety cushions, mat assemblies and anchors to prevent injuries to a person falling off playground equipment by reducing the impact g-force to the head of less than 200 g's from a drop height of up to twelve feet. It is understood that changes and variations can be made therein without departing from the scope of the invention as defined in the following claims.

What is claimed is:

1. An anchor for securing a safety cushion, comprising:

a rounded head portion,
   a bolt portion secured to the head portion along a longitudinal axis substantially perpendicular to the head portion, a plurality of different-sized triangular projections forming two sets of linearly aligned different-sized triangular projections protruding from said bolt portion parallel along said axis along diametrically opposed sides of said bolt portion for securing the safety cushion; with each triangular projection extending parallel to the longitudinal axis of the bolt portion;
   a support cord located along said axis of said bolt portion to improve the tensile strength of said anchor; and
   said head portion and said bolt portion being comprised of a resilient material having a shore hardness of about 73 and being capable of providing protection against injuries to persons falling from a height of up to twelve feet by compressing to reduce the impact g-force to a headform to less than 200 g's.

2. The anchor of claim 1 wherein said head portion further has a diameter of 1.5–1.8 inches.

3. The anchor of claim 2 wherein said head portion further has a thickness of 0.25–0.4 inches.

4. The anchor of claim 3 wherein said bolt portion further has a length of 4–5.7 inches.

5. The anchor of claim 4 wherein said bolt portion further has a diameter of 0.5–0.7 inches.

6. The anchor of claim 1 wherein said head portion further comprises a metal washer to provide further anchoring support to prevent the impact attenuation safety cushion and system from being pulled up from the ground.

* * * * *

UNITED STATES PATENT AND TRADEMARK OFFICE
CERTIFICATE OF CORRECTION

PATENT NO. : 5,428,935
DATED : July 4, 1995
INVENTOR(S) : Chester L. Mitchell

It is certified that error appears in the above-indentified patent and that said Letters Patent is hereby corrected as shown below:

Column 10, line 38, delete "°" after 72.

Column 10, line 38, delete "°" after 23.

Column 12, line 38, in Table 3, delete "N650 Balck" and insert --N650 Black-- therefor.

Signed and Sealed this

Nineteenth Day of March, 1996

Attest:

BRUCE LEHMAN

Attesting Officer     Commissioner of Patents and Trademarks